US007102770B2

(12) United States Patent
Wells et al.

(10) Patent No.: US 7,102,770 B2
(45) Date of Patent: Sep. 5, 2006

(54) SYSTEM AND METHODS FOR SMOOTHING SENSED TONER LEVELS

(75) Inventors: Trevor A. Wells, Vancouver, WA (US); Kevin A. Owen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 986 days.

(21) Appl. No.: 09/881,442

(22) Filed: Jun. 13, 2001

(65) Prior Publication Data

US 2002/0191207 A1 Dec. 19, 2002

(51) Int. Cl.
*G06F 15/00* (2006.01)
*G06K 15/02* (2006.01)

(52) U.S. Cl. .................... 358/1.14; 358/1.13; 358/1.15

(58) Field of Classification Search ........ 101/363–366; 399/27, 24, 29, 106, 262; 347/7, 19, 214, 347/85, 86; 358/1.14, 1.13, 1.15
See application file for complete search history.

(56) References Cited

U.S. PATENT DOCUMENTS 5,802,420 A * 9/1998 Garr et al. .................... 399/27
6,619,206 B1 * 9/2003 Koehler ...................... 101/364

OTHER PUBLICATIONS

Scott Barber, User Experience, not Metrics: What is an Outlier and How do I Account for One?, www.perftestplus.com.*

* cited by examiner

*Primary Examiner*—King Y. Poon

(57) ABSTRACT

The system and methods described herein relate to reporting the supply level of a marking agent (e.g., toner) in a print device cartridge. An algorithm executes to smooth over inaccuracies in measured values received from a hardware supply level sensor. Through seeding an initial report level and adjusting that level based on average groups of sensor readings that exclude outlying values, the algorithm facilitates supply level reports that follow a naturally decreasing trend throughout the life of a print device cartridge.

39 Claims, 7 Drawing Sheets

From Block 506 of Fig. 5

To Block 516 of Fig. 5

From Block 512 or 514 of Fig. 5

SYSTEM AND METHODS FOR SMOOTHING SENSED TONER LEVELS

TECHNICAL FIELD

The present invention relates to sensing toner levels in print device toner cartridges and, more particularly, to the smoothing of percent degradation values of sensed toner levels to present a uniform reduction in toner over the lifetime of a toner cartridge.

BACKGROUND

Consumable items in printing devices mostly include "marking agent" components that are consumed with each printed page as part of the printed product, and rotating components that deteriorate over time as a result of wear and tear. Marking agent consumables include ink, wax, powder toner, thermal agents, and the like. Marking agents are often housed in some type of cartridge, such as a toner cartridge, and dispensed onto rotating components that transfer the agents to a print medium during a printing process. As a marking agent is depleted, it is useful to have information about the amount of agent remaining in a cartridge in order to approximate the number of pages available for printing during the remaining life of the cartridge. Various methods exist that provide information regarding the remaining useful life of a cartridge.

A page counting method does not involve direct measurement information about the level of toner (i.e., marking agent) present in a cartridge. Instead, this method provides an expected life span for a toner cartridge measured by the number of pages that the cartridge is expected to print. The life span is reduced by one page for each page that is printed. A disadvantage of this simple method is that it can be inaccurate.

The inaccuracy of this method can result from at least two factors. First, the expected number of pages available from a toner cartridge is a rough estimate set by the cartridge designer based on numerous examples of like cartridges. The actual number of available pages can vary significantly from cartridge to cartridge. Second, the amount of toner put on each printed page may vary dramatically from page to page. These factors often mean that more or less toner is left in a cartridge than expected, which can result in significant differences in the number of pages expected to be printed and the number of pages that can actually be printed by a given cartridge.

A pixel counting method also does not involve direct measurement information about the level of toner present in a cartridge. Rather, this method starts with an assumed maximum number of pixels available to be expended over the life of the cartridge. In a color laser printer, the number of pixels expended can be estimated by tracking the number of laser pulses used to magnetize a photoconductor drum. Four laser pulses will magnetize the drum to statically charge one pixel. The number of laser pulses can be measured for each printed page, and the appropriate number of pixels can be subtracted from the maximum pixels available, thereby providing a measure of the percentage of pixels (i.e., toner) remaining in the cartridge.

Unfortunately, this method suffers disadvantages similar to the previous method. The maximum number of available pixels is assumed by the cartridge designer based on numerous examples of like cartridges. The actual number of available pixels can vary significantly from cartridge to cartridge. In addition, counting laser pulses can be an inaccurate method of determining the number of expended pixels on a printed page. Although the error per page may be slight, it can add up over the life of the cartridge (e.g., 10,000 printed pages) and create a significant difference in the expected percentage of toner available and the actual percentage of toner available. Moreover, the largest errors are seen toward the end of the cartridge life cycle, which is the time when it is most important to have accurate toner level information.

Another method of determining the toner level within a cartridge utilizes antenna sensor technology. This method provides direct information about the level of toner in a cartridge by passing current from one end of the cartridge to the other through an antenna. The current induces voltage signals in coils within the cartridge that are proportional to the amount of toner present in the cartridge. Although this direct measurement of the toner level is beneficial, it too has disadvantages.

Most toner level antenna sensors provide readings that have a wide degree of deviation. The jostling or movement of toner within a cartridge can cause the voltage signals from the antenna sensor to vary by as much as 16 to 20 percent between readings. Toner movement is significant in carousel-arranged cartridges that rotate during a color print process to provide access to the different color toners. The deviation in toner readings can occur as often as every sample interval, such as after every printed page. Reported toner levels may jump drastically and provide no real sense of the actual toner level. For example, a user may notice that the reported toner level jumps from a lower value to a higher value even though significant printing has occurred between the two readings. Therefore, for any given toner level reading, a user is not really sure of how much toner remains in the cartridge. In addition, such deviation does not provide a uniform decrease in the reported toner level over time, and therefore does not ensure a level of predictability as to the remaining life of a toner cartridge.

Accordingly, the need exists for a way to accurately determine the amount of toner within a toner cartridge and to report this information in a manner that permits predictability as to the remaining useful life of the toner cartridge.

SUMMARY

A printer system senses toner (or other marking agent) levels in a toner cartridge and executes an algorithm to smooth the sensed levels. The smoothing algorithm provides toner level reports that follow a uniform percent degradation in reported amounts of toner over the life of a toner cartridge, which in turn, permits a higher level of predictability as to the remaining life of a toner cartridge and the number of pages available for printing from the cartridge. The algorithm accounts for the inaccuracies of hardware supply level sensors and prevents the need for more complex and costly hardware sensors.

When a print device is powered up or a toner cartridge within the device is removed and replaced, the algorithm executes to set the toner report level to an arbitrary value. The arbitrary value is preferably higher than 100% and serves to indicate to a user that the toner report level is in an unknown state.

The algorithm then seeds the toner report level with an initially measured value. The seeded value is determined by receiving a number of readings from a toner level sensor (e.g., an antenna sensor) on the cartridge and selecting the highest reading as the seeded value.

After the toner report level is seeded, a group of toner level sensor readings is received and averaged. The report level is set to the average value of these readings if the average value is less than the seeded toner report level. A second group of toner level sensor readings is then received and screened to ensure that each reading is within a prescribed percent (e.g., +/−10%) of the report level. Readings that are not within the prescribed percent of the report level are presumed to be inaccurate, and thus rejected. A preset number of screened readings is then averaged, and if the average value of this group of readings is less than the seeded toner report level, the report level is set to the average value.

From then on, throughout the life of the toner cartridge, the toner report level is adjusted downward accordingly by averaging subsequent groups of toner level sensor readings and setting the report level to those average values that are less than the current report level. Again, all readings within subsequent groups are screened to ensure they fall within a prescribed percent of the current toner report level in order to eliminate outlying values that are presumed to be inaccurate.

BRIEF DESCRIPTION OF THE DRAWINGS

The same reference numbers are used throughout the drawings to reference like components and features.

DETAILED DESCRIPTION

The system and methods described herein relate to reporting the supply level of a marking agent (e.g., toner) in a print device cartridge. An algorithm executes to smooth over inaccuracies in measured values received from a hardware supply level sensor. Through seeding an initial report level and adjusting that level based on average groups of sensor readings that exclude outlying values, the algorithm facilitates supply level reports that follow a naturally decreasing trend throughout the life of a print device cartridge.

Exemplary System for Smoothing Sensed Toner Levels

Figure 1:
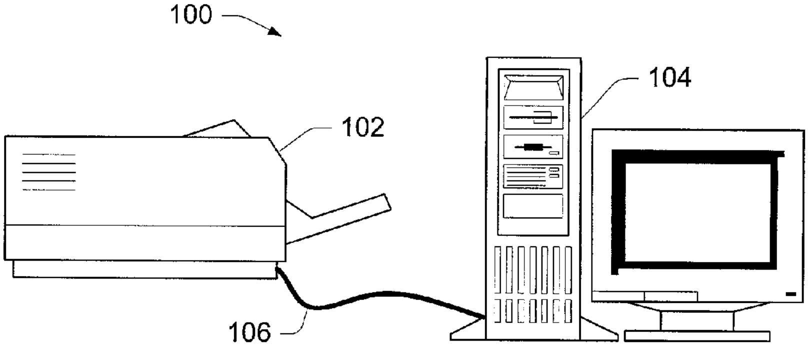
FIG. 1 illustrates a workstation and a printing device as a suitable system environment in which to smooth sensed marking agent supply levels from a printing device cartridge.

FIG. 1 illustrates an example of a printing system that is suitable for smoothing sensed toner levels from a toner cartridge in a print device. The system 100 of FIG. 1 includes a printer device 102 connected to a host computer 104 through a direct or network connection 106. Network connections 106 can include LANs (local area networks), WANs (wide area networks), or any other suitable communication link. The invention is applicable to various types of printing devices that make use of marking agent consumables such as ink, wax, powder toner, thermal agents, and the like. Therefore, printer device 102 can include devices such as copiers, fax machines and scanners, and may also include multifunction peripheral (MFP) devices which combine the functionality of two or more peripheral devices into a single device.

In general, the host computer 104 outputs host data to the printer device 102 in a driver format suitable for the device 102, such as PCL or postscript. The printer device 102 converts the host data and outputs it onto an appropriate recording media, such as paper or transparencies.

Figure 2:
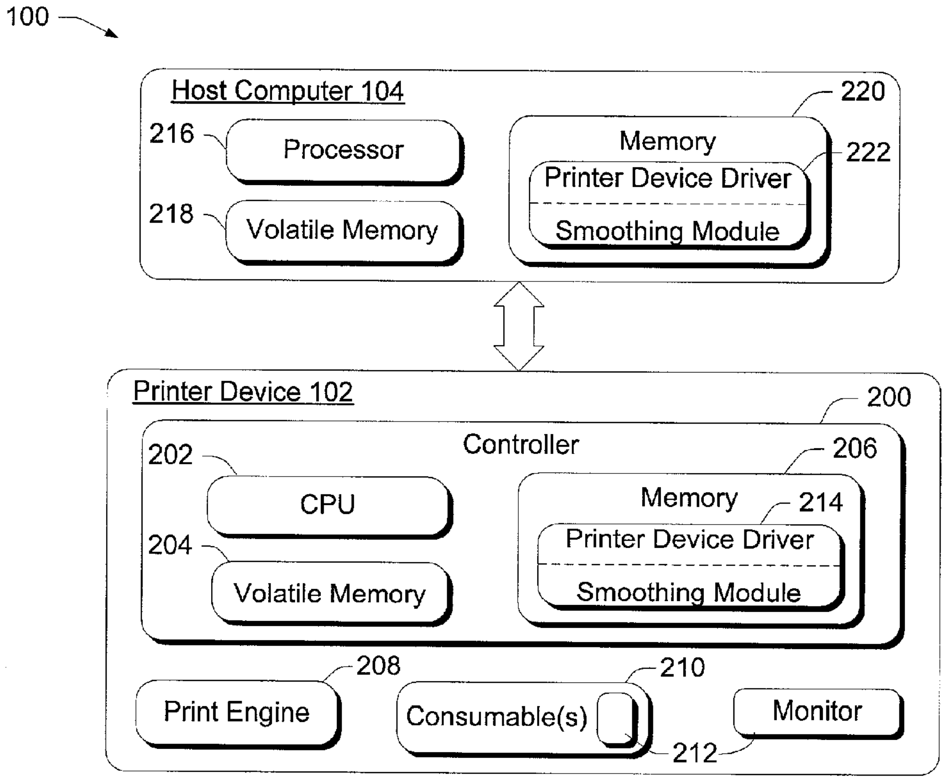
FIG. 2 is a block diagram illustrating a system such as that in FIG. 1.

FIG. 2 illustrates the printer system 100 in more detail. The printer device 102 has a controller 200 that processes the host data. The controller 200 typically includes a data processing unit or CPU 202, a volatile memory 204 (i.e., RAM), and a non-volatile memory 206 (e.g., ROM, Flash). Printer device 102 includes a print engine 208 and one or more consumable printing components 210. Consumable(s) 210 represent marking agents typically housed in cartridges whose supply levels decrease with each printed page output by print device 102. Therefore, consumable(s) 210 generally include cartridges and other containers that hold ink, wax, powder toner, thermal agents, and the like. Other typical print device consumables such as paper, photoconductors, transfer drums or belts, and fusers are not illustrated in FIG. 2, but are discussed below with reference to FIG. 3.

Consumable(s) 210 include monitoring devices 212 located either on the print device 102 or on the consumable 210 itself. The monitoring devices 212 monitor the toner (i.e., marking agent) supply levels within consumables 210. Monitoring devices 212 are preferably antenna sensor devices that measure supply levels within a cartridge by passing current from one end of the cartridge to the other through an antenna. The current induces voltage signals in coils within the cartridge that are proportional to the amount of toner present in the cartridge.

As discussed in the background section, most toner level antenna sensors 212 provide readings that have a wide degree of deviation caused primarily by the movement of toner within a cartridge. The invention directly addresses the deviation in such sensor readings. Therefore, although monitoring devices 212, or toner level sensors 212, preferably consist of antenna sensor devices, they can include any level sensor device that is prone to providing readings that vary based on factors other than the true level of toner or marking agent present within a cartridge.

The printer controller 200 processes host data and manages the print process by controlling the print engine 208 and consumable(s) 210. Printer controller 200 includes printer driver software 214 executing on CPU(s) 202. The printer driver software 214 is stored in memory 206 and includes a smoothing module that executes to smooth over toner supply level readings received from monitoring devices 212. The smoothing module 214 facilitates the printer system 100 in providing reports to system users on the percentage of toner or other marking agents remaining in a print device 102 cartridge. The reports can be output on print device 102, the host computer 104, or any suitable display device coupled to print device 102. Although the printer driver software 214 and smoothing module generally execute on print device 102, they may also be stored and execute on the host computer 104 as illustrated by printer driver 222.

The host computer 104 includes a processor 216, a volatile memory 218 (i.e., RAM), and a non-volatile memory 220 (e.g., ROM, hard disk, floppy disk, CD-ROM, etc.). The host computer 104 may be implemented, for example, as a general-purpose computer, such as a desktop personal computer, a laptop, a server, and the like. The host computer 104 may implement one or more software-based printer drivers 222 that are stored in non-volatile memory 220 and executed on the processor 216 to configure data into an appropriate format (e.g., PCL, postscript, etc.) and output the formatted data to the printer device 102.

Exemplary Print Process for Smoothing Sensed Toner Level Values

Figure 3:
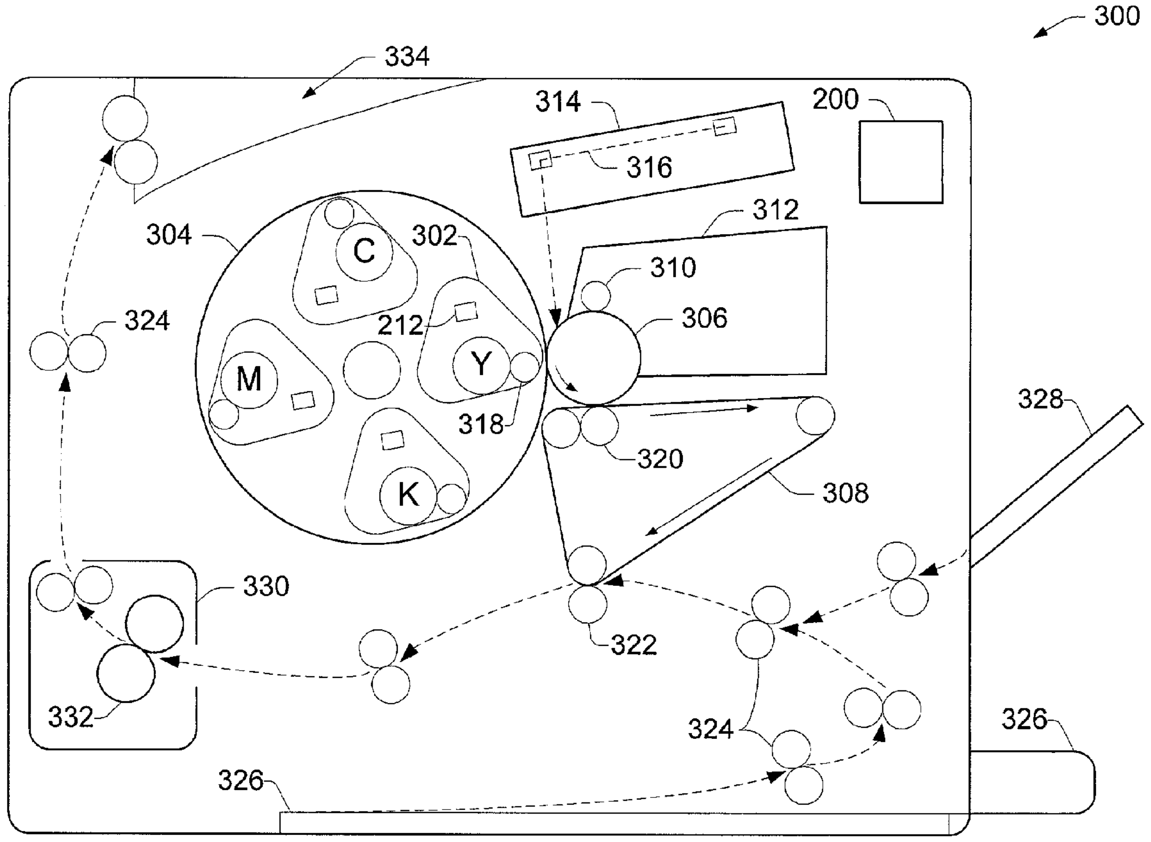
FIG. 3 illustrates a printer device which uses a number of toner cartridges and various other consumable components.

FIG. 3 represents a color laser printer 300 as an example print device 102 that may be used in the printing system 100 of FIGS. 1 and 2. A general printing process will now be described with respect to color laser printer 300 for the purpose of illustrating a context for smoothing sensed supply level values and reporting the percentage of toner or other marking agent remaining in a print device 102 cartridge.

A typical color laser printer 300 produces an image using various colored toners. During an imaging process, a four color image is built sequentially onto a transfer element, such as an intermediate transfer belt 308, before it is finally transferred to the print medium (e.g., paper or transparency) in one pass. The ultimate application of the toners to the print medium is controlled by an electrostatic imaging process.

Color printer 300 houses four toner cartridges 302 in a rotating carousel 304 that is operational with a photoconductor (OPC) drum 306. Toner cartridges 302 contain the four main toner colors cyan (C), magenta (M), yellow (Y), and black (K). Although the toner cartridges 302 are illustrated as separate devices inserted into rotating carousel 304, they may additionally be implemented as a single all-in-one color cartridge that includes the four toner colors. For example, the rotating carousel 304 may represent a single all-in-one color cartridge, while toner cartridges 302 represent separate housings within the all-in-one cartridge for accommodating the four color toners. In addition, OPC drum 306 may be implemented as one or more OPC drums. For example, there may be four OPC drums 306, one to accommodate the transfer of each color toner.

To begin the imaging process, a primary charge roller 310 within the OPC drum assembly 312 applies an electrostatic charge to the OPC drum 306. As the OPC drum 306 rotates, a laser assembly 314 writes the latent image for the first color onto the drum 306 with laser 316. The toner carousel 304 then puts the first color toner cartridge 302 into position for operation with the OPC drum 306. Within toner cartridge 302, an agitator (not shown) guides toner to a developer roller 318. As the developer roller 318 and OPC drum 306 rotate, the toner is developed to the latent image electrostatically formed on the OPC drum 306.

Each color image is thus developed one at a time on the OPC drum 306. Also, each color image is transferred one at a time to the rotating intermediate transfer belt (ITB) 308 because of attraction from electric charge on primary transfer roller 320. Once the four-color image has been built on the ITB 308, the secondary transfer roller 322 is activated to attract the image away from the ITB 308 and onto the paper in one pass of the ITB 308 over the paper. The paper is guided by guide rollers 324 from a paper tray 326 or external source 328 past the ITB 308 and then through the fuser assembly 330. The fuser assembly 330 includes two hot rubber fuser rollers 332 that melt the toner, bonding it to the paper. From the fuser assembly 330, the paper exits the printer 300 into the output tray 334.

With each page printed by the color laser printer 300, supply levels within toner cartridges 302 decrease. A monitoring device 212, such as an antenna sensor, monitors the level of toner remaining in a cartridge 302 and communicates this information to printer controller 200. The printer controller 200 uses the information to create reports on the percentage of toner or other marking agent remaining in the cartridge 302. The printing system 100 (FIGS. 1 and 2) typically presents the reports upon request to system users through a display on printer 300 or a display on host computer 104.

Exemplary Methods for Smoothing Sensed Toner Level Values

Having introduced an example system 100 in which an algorithm for smoothing sensed toner levels can be implemented, example methods for implementing the smoothing algorithm will now be described with primary reference to FIGS. 4–8.

Figure 4:
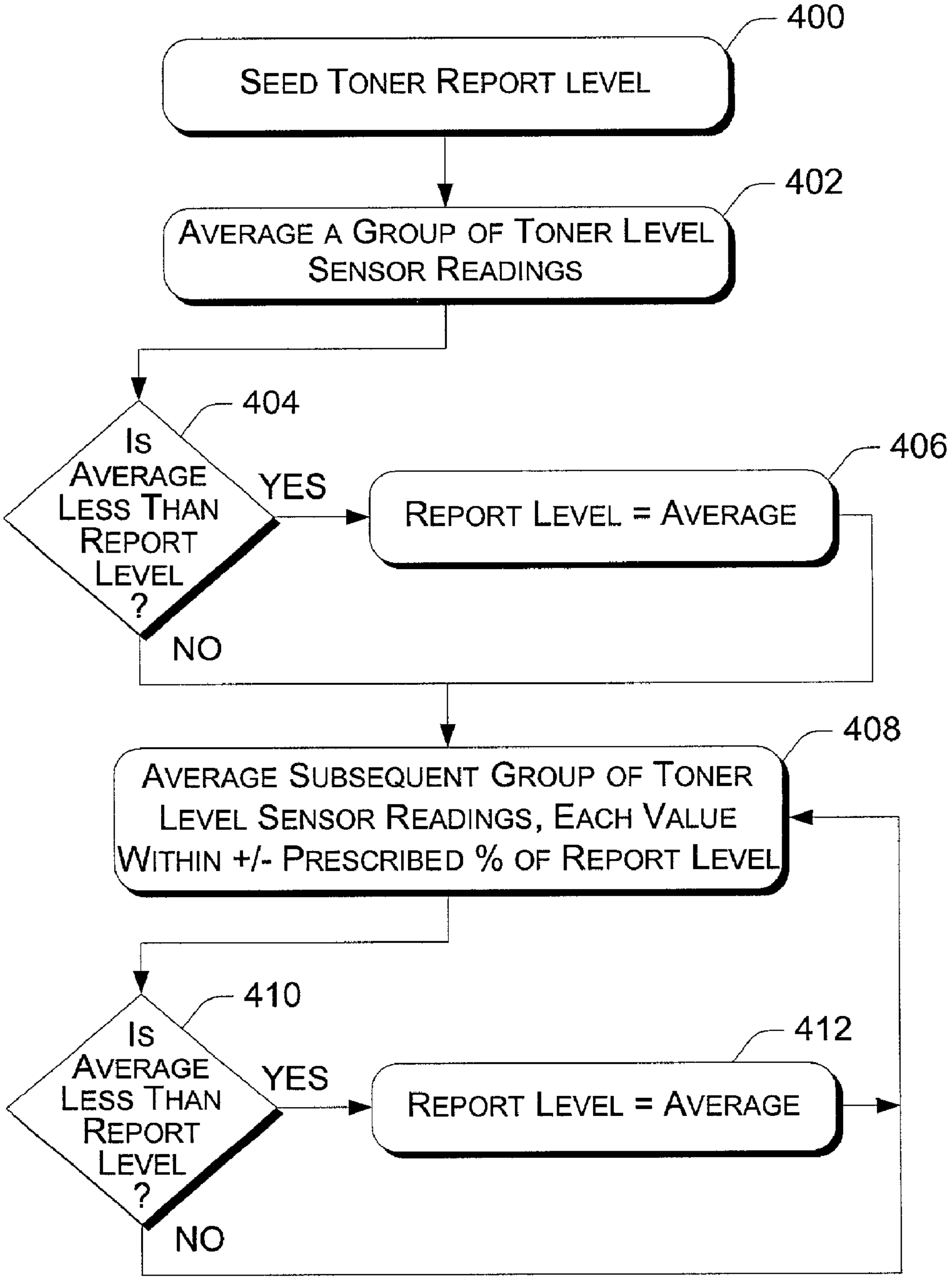
FIG. 4 is a flow diagram illustrating an example method of smoothing toner level sensor values and setting toner report levels throughout the life of a toner cartridge.

FIG. 4 is a flow diagram illustrating an example of a general method for smoothing toner level sensor 212 (monitoring device) values and setting toner report levels throughout the life of a toner cartridge. Operations included in the method of FIG. 4 are ideally performed in a system 100 such as that shown in FIGS. 1 and 2, and are typically implemented on either a print device 102 or a host computer 104. However, the method operations of FIG. 4 are not limited to being performed on a single device, but can also be performed alternately between devices such as print device 102 and host computer 104.

The example method of FIG. 4 begins at operation 400 with the seeding of a toner report level. As used throughout the various sections of this document, including the summary, the detailed description, and the claims, the word "seeding" and its variants should be generally understood as meaning establishing an initial value. The toner report level is a value reported to a system user indicating the amount of toner or other marking agent present in a toner cartridge installed in a print device 102. The toner report level is typically provided as the percentage of toner that remains in the cartridge, and can be presented to a user upon request or at a preset interval. The seeded value is determined by selecting the highest value of one or more initial readings received from a toner level sensor 212 on the toner cartridge. The seeding of the toner report level occurs only one time within any method cycle. A method cycle begins either when a print device 102 is turned on or when a toner cartridge within a print device 102 is replaced. Removal and reinstallation of the same toner cartridge into a print device 102 and opening and closing the toner cartridge door on the print device 102 generally also constitute the beginning of a method cycle.

After the toner report level is seeded, a group of readings from the toner level sensor 212 is averaged at operation 402. The number of readings used in the averaging is typically experimentally predetermined. The number is preferably large enough that the average value closely represents the actual amount of toner present in the toner cartridge, but is not so large that a point of diminishing returns is reached regarding the accuracy of the average. Thus, eight readings is a preferred number of readings used in the averaging of operation 402.

At operation 404 the average of the group of readings is compared to the value of the toner report level. If the average is less than the toner report level, the report level is set equal to the average at operation 406. If the average is not less than the toner report level, the report level is not changed, and operation 408 is executed. Because the seeded value of the toner report level is set to the highest of an initial group of sensor readings at operation 400, it is expected that the average of the first group of toner sensor level readings will be lower than the report level, and that the report level will therefore be adjusted downward accordingly.

At operation 408, a subsequent group of readings from the toner level sensor 212 is averaged. The number of readings used in the subsequent group average is determined as described above, and is generally the same number of readings used in calculating the prior group average. In addition, however, each reading in the subsequent group of readings is required to be within a prescribed percent of the current toner report level. This requirement eliminates outlying sensor readings that are presumed to be inaccurate by virtue of inherent sensor 212 inaccuracies. Therefore, depending on how many outlying readings are eliminated, the number of readings required from the toner level sensor 212 to properly complete the subsequent group of readings may vary. The prescribed percent is preferably +/−10%, but can be any percent range determined to be statistically significant in eliminating outlying sensor readings. The resulting average calculated from the subsequent group of readings therefore provides a more realistic representation of the actual amount of toner present in the cartridge.

At operation 410 the average of the subsequent group of readings is compared to the value of the toner report level. If the average is less than the toner report level, the report level is set equal to the average at operation 412. Operation 408 is then repeated. If, at operation 410, the average is not less than the toner report level, the report level is not changed, and operation 408 is again repeated. The method continues in this manner, repeating operations 408, 410 and 412 throughout the life of the toner cartridge.

The result of the method illustrated in FIG. 4 is a continually decreasing, rather than erratic, toner report level that provides accurate information to a system user about the amount of toner remaining in a toner cartridge.

Figure 5:
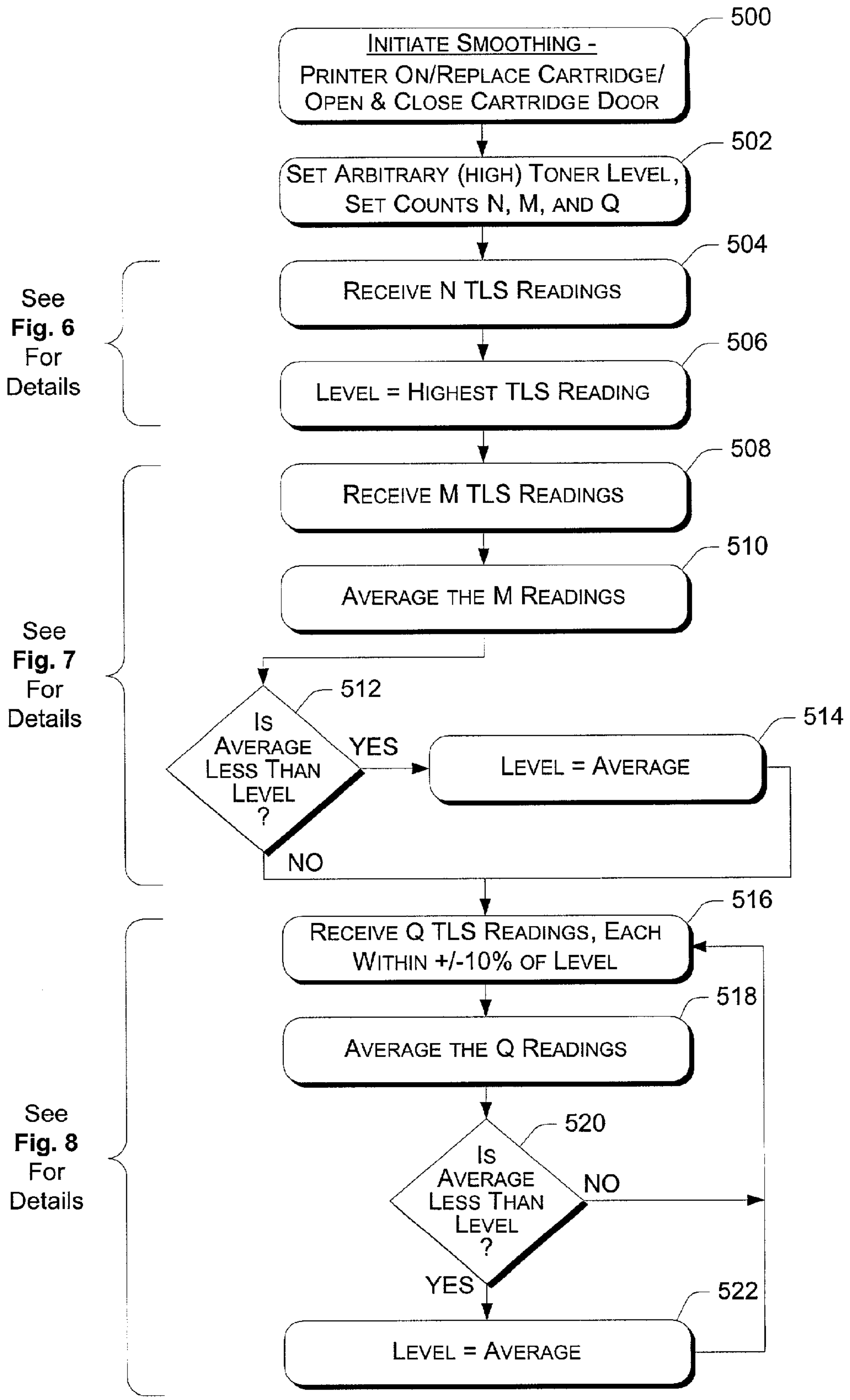
FIG. 5 is a flow diagram illustrating a more detailed example of a method of smoothing toner level sensor values and setting toner report levels throughout the life of a toner cartridge.

FIG. 5 is a flow diagram illustrating a more detailed example of a method of smoothing toner level sensor values and setting toner report levels throughout the life of a toner cartridge. The flow diagram of FIG. 5 will be discussed with further reference to flow diagrams in FIGS. 6–8, which illustrate example implementations of each stage of the method of FIG. 5.

The example smoothing method of FIG. 5 can be initiated in a variety of ways as illustrated in operation 500. The method is typically triggered by the power up of a print device 102, the replacement of a print device toner cartridge, or the opening and closing of the cartridge door on the print device 102. These types of event indicate to the printer controller 200 that the toner level smoothing algorithm is to be initiated or reinitiated if already in progress.

Operation 502 illustrates that the method begins with setting the toner report level to an arbitrarily high value and setting the values for three counts, N, M and Q. The arbitrary toner report level is preferably set at a value higher than 100% and serves to indicate to a user that the toner report level is in an unknown state.

The next operation 504 is that of receiving N toner level sensor 212 readings. The toner report level is then set to the highest of these readings at operation 506. Operations 504 and 506 serve to seed the toner report level with an initial measured value from the toner level sensor 212. The number of readings, N, used in selecting the initial measured value is typically experimentally predetermined to provide a high enough seeded toner report level that subsequent operations will decrease, rather than increase, later toner report levels. This helps provide toner level reports that follow a uniform percent degradation in reported amounts of toner over the life of a toner cartridge.

Figure 6:
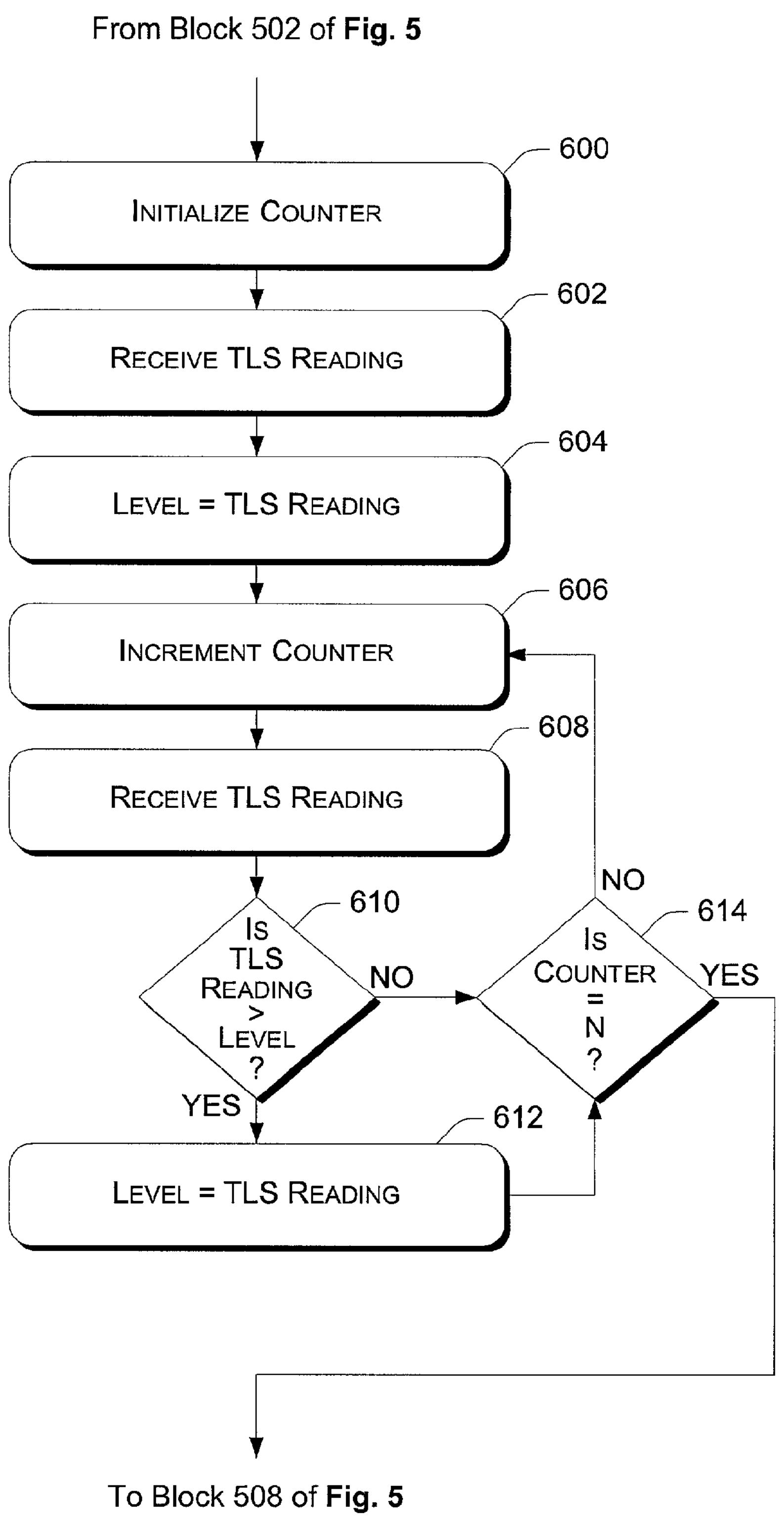
FIGS. 6–8 are flow diagrams illustrating example implementations of each stage of the method of FIG. 5.

An example implementation of operations 504 and 506 is detailed by the flow diagram of FIG. 6. At operation 600, a counter is initialized (typically to zero) for later comparison to the value set above for count N. At operation 602, a toner level sensor 212 reading is received, and the toner report level is set to this reading value at operation 604. The counter is then incremented at operation 606. Another toner level sensor 212 reading is received at operation 608 and compared to the toner report level at operation 610. If the toner level sensor 212 reading is greater than the current toner report level, then the toner report level is reset to the value of the reading at operation 612. If not, the toner report level is left unchanged. In either case, the counter is compared to count N, and if the counter has not reached the value of count N, operations 606–614 are repeated, beginning with incrementing the counter at operation 606. If the counter has reached the value of count N, then the toner report level has been set to the highest of N toner level sensor 212 readings as operations 504 and 506 indicate, and the method of FIG. 5 moves on with operation 508.

Referring again to FIG. 5, the method continues by receiving M toner level sensor 212 readings at operation 508. The M readings are averaged at operation 510. At operation 512, the average of the M readings is compared to the current toner report level. If the average is less than the toner report level, the toner report level is set equal to the average, thereby adjusting the toner report level downward. If the average is not less than the toner report level, the toner report level is left unchanged. The number of readings, M, used in calculating the average is preferably large enough that the average value closely represents the actual amount of toner present in the toner cartridge, but is not so large that a point of diminishing returns is reached regarding the accuracy of the average. The number eight has been experimentally determined to be a preferred number of readings for averaging at operation 510.

Figure 7:
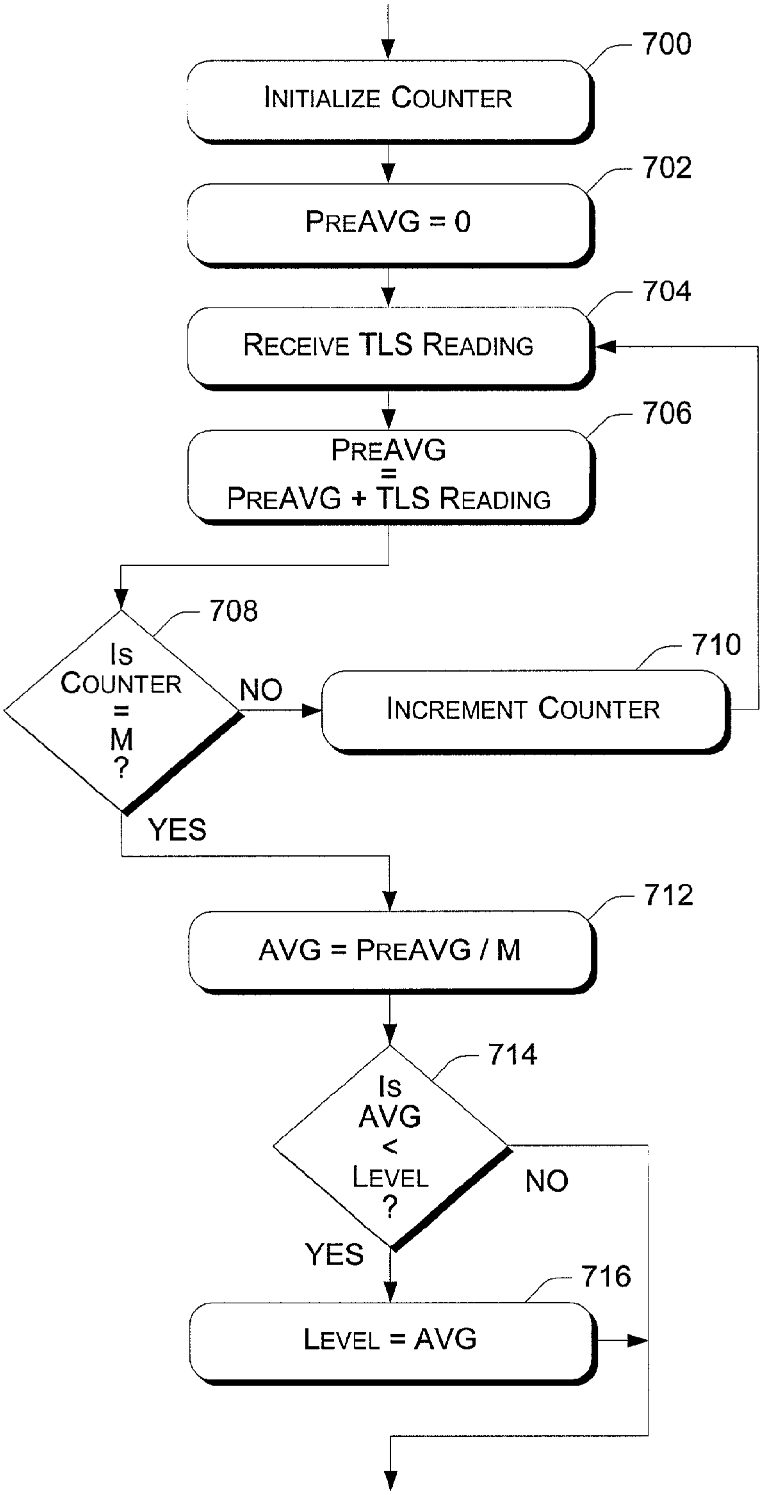

An example implementation of operations 508–514 is detailed by the flow diagram of FIG. 7. At operation 700, a counter is initialized (typically to zero) for later comparison to the value set above for count M. At operation 702, a variable used as a pre-average is initialized to zero. This variable will be increased by M number of toner level sensor 212 readings until it is later converted to an average. At operation 704, a toner level sensor 212 reading is received, and this reading is added to the pre-average at operation 706. The counter is then checked at operation 708 to determine if it has reached the value set for count M. If the counter has not reached M, it is incremented at operation 710 and operations 740–710 are repeated as needed until the counter reaches count M. When the counter reaches count M, the pre-average is divided by M at operation 712 to determine the average of the M toner level sensor 212 readings. The average is then compared to the current toner report level at operation 714. If the average is less than the toner report level, the toner report level is reset to the value of the average at operation 716. If the average is not less than the toner report level, the toner report level is left unchanged. In either case, the method of FIG. 5 moves on with operation 516.

Referring again to FIG. 5, the method continues by receiving Q toner level sensor 212 readings at operation 516. However, each of the Q readings is screened to ensure that it falls within a certain prescribed percent of the current toner report level. The screening further refines the accuracy of the toner report level by eliminating outlying sensor 212 readings that are presumed to be inaccurate by virtue of inherent sensor 212 inaccuracies. Depending on how many outlying readings are eliminated, the number of readings required from the toner level sensor 212 to complete a group of properly screened Q readings may vary. The prescribed percent is preferably +/−10%, but can be any percent range determined to be statistically significant in eliminating outlying sensor readings.

The Q readings are averaged at operation 518. The number of readings, Q, used in calculating the average is preferably large enough that the average value closely represents the actual amount of toner present in the toner cartridge, but is not so large that a point of diminishing returns is reached regarding the accuracy of the average. The number eight has been experimentally determined to be a preferred number of readings for averaging at operation 518.

At operation 520, the average of the Q readings is compared to the current toner report level. If the average is less than the toner report level, the toner report level is set equal to the average, thereby adjusting the toner report level downward. If the average is not less than the toner report level, the toner report level is left alone. In either case, the method then repeats operations 516–522 throughout the remaining life of the toner cartridge, or until an event occurs which reinitiates the method as illustrated by operation 500. As the method continually cycles through operations 516–522, the toner report level accurately and uniformly decreases.

Figure 8:
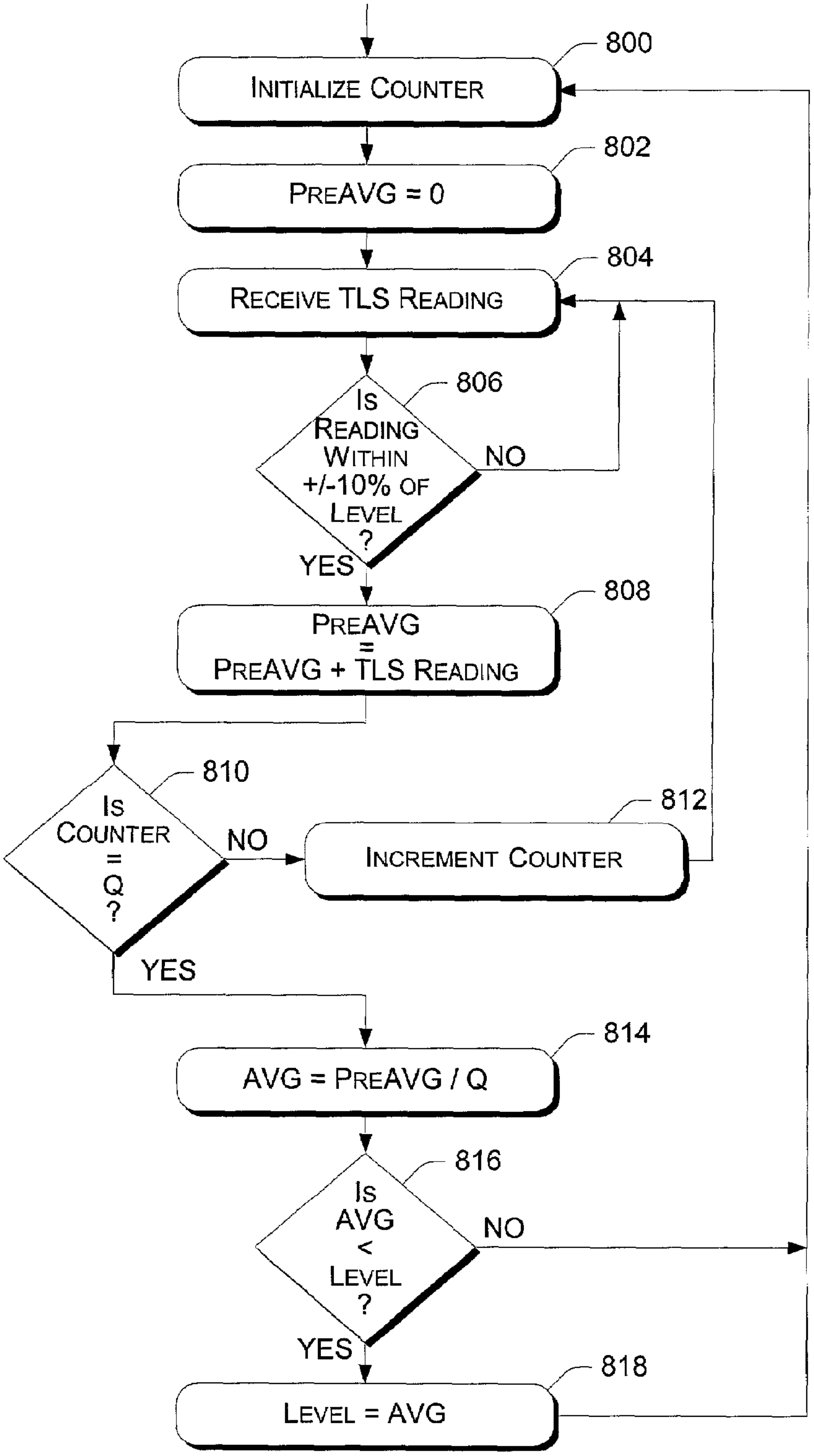

An example implementation of operations 516–522 is detailed by the flow diagram of FIG. 8. At operation 800, a counter is initialized (typically to zero) for later comparison to the value set above for count Q. At operation 802, a variable used as a pre-average is initialized to zero. This variable will be increased by Q number of toner level sensor 212 readings until it is later converted to an average. At operation 804, a toner level sensor 212 reading is received. This reading is screened at operation 806 to ensure that it falls within a certain prescribed percent (preferably +/−10%) of the current toner report level. If the reading does not fall within the prescribed percent of the toner report level, another toner level sensor 212 reading is received and similarly evaluated, as operations 804 and 806 are repeated.

When a reading falls within the prescribed percent, it is added to the pre-average at operation 808. The counter is then checked at operation 810 to determine if it has reached the value set for count Q. If the counter has not reached count Q, it is incremented at operation 812, and operations 804–812 are repeated as needed until the counter reaches count Q. When the counter reaches count Q, the pre-average is divided by Q at operation 814 to determine the average of the Q toner level sensor 212 readings. The average is then compared to the current toner report level at operation 816. If the average is less than the toner report level, the toner report level is reset to the value of the average at operation 818. If the average is not less than the toner report level, the toner report level is left alone. In either case, the method returns to operation 800 and repeats operations 800–818 throughout the remaining life of the toner cartridge, resulting in an accurate and uniform decrease in the toner report level.

Throughout the operation of the methods described above, toner level sensor 212 readings can be received passively or actively. In a passive sense, the readings are received when the toner level sensor 212 senses a change in the toner level. The readings are therefore "pushed" from the toner level sensor 212 when a change in the value of the toner level is sensed. A reading is typically pushed at least as often as the printing of each page by a print device 102. In an active sense, the readings are requested from the toner level sensor 212 at a preset interval. The readings are therefore "pulled" from the toner level sensor 212. The interval can be based on a period of time or on an event such as the printing of each page.

In addition, throughout the operation of the methods described above, the toner report level can be reported to a system user upon request by the user, or at a preset interval. Typically, requests for the toner report level are made either at a display panel on the print device 102, or at the host computer 104. The toner report level can be displayed at either location. Toner report levels displayed at preset intervals can be displayed based on intervals of time (e.g., every week), or based on events (e.g., every 1000 printed pages).

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:

setting a toner report level upon powering up a print device or replacing a toner cartridge; then averaging a group of toner level sensor readings to produce a group average;

if the group average is less than the report level, setting the report level to the group average;

if the group average is not less than the report level, leaving the report level unchanged; and then averaging a subsequent group of toner level sensor readings to produce a subsequent group average, each reading being within a prescribed percent of the report level;

if the subsequent group average is less than the report level, setting the report level to the subsequent group average;

if the subsequent group average is not less than the report level, leaving the report level unchanged.

2. A method as recited in claim 1, wherein setting a toner report level upon powering up a print device or replacing a toner cartridge further comprises:

receiving toner level sensor readings and selecting the highest reading as the toner report level.

3. A method as recited In claim 1, further comprising:

continually repeating the recited actions of:

averaging a subsequent group of toner level sensor readings to produce a subsequent average, each reading being within a prescribed percent of the report level; and if the subsequent group average is less than the report level, setting the report level to the subsequent group average.

4. A method as recited in claim 1, further comprising:

prior to setting a toner report level upon powering up a print device or replacing a toner cartridge, setting the report level to an arbitrary value.

5. A method as recited in claim 1, wherein averaging further comprises:

receiving toner level sensor readings that are pushed from the toner level sensor each time a change occurs in the sensed reading.

6. A method as recited in claim 1, wherein averaging further comprises:

receiving toner level sensor readings that are pulled from the toner level sensor at a preset interval.

7. A method as recited in claim 6, wherein the preset interval is a temporal interval.

8. A method as recited in claim 6, wherein the preset interval is an event based interval.

9. A method as recited in claim 1, further comprising:

reporting the report level upon request.

10. A method as recited in claim 1, further comprising:

reporting the report level automatically upon a preset interval.

11. A print device, having computer-readable media with computer-readable instructions for performing the method as recited in claim 1.

12. A computer, having computer-readable media with computer-readable instructions for performing the method as recited in claim 1.

13. A method comprising:

setting a toner report level; then averaging a group of toner level sensor readings to produce a group average;

if the group average is less than the report level, setting the report level to the group average;

if the group average is not less than the report level, leaving the report level unchanged; and then averaging a subsequent group of toner level sensor readings to produce a subsequent group average;

if the subsequent group average is less than the report level, setting the report level to the subsequent group average;

if the subsequent group average is not less than the report level, leaving the report level unchanged.

14. A method as recited in claim 13, wherein each toner level sensor reading in the subsequent group of toner level sensor readings is within a prescribed percent of the report level.

15. A method as recited in claim 13, wherein setting a toner report level further comprises:

receiving toner level sensor readings and selecting the highest reading as the toner report level.

16. A method as recited in claim 13, further comprising:

continually repeating the recited actions of:

averaging a subsequent group of toner level sensor readings to produce a subsequent average; and if the subsequent group average is less than the report level, setting the report level to the subsequent group average.

17. A method as recited in claim 13, further comprising:

prior to setting a toner report level, setting the report level to an arbitrary value.

18. A print device, having computer-readable media with computer-readable instructions for performing the method as recited in claim 13.

19. A computer, having computer-readable media with computer-readable instructions for performing the method as recited in claim 13.

20. A method comprising:

receiving N readings from a toner level sensor;

setting a report value to the highest of the N readings; then receiving M readings from the toner level sensor;

calculating an M reading average;

if the M reading average is less than the report value, setting the report value to the M reading average;

if the M reading average is not less than the report value, leaving the report value unchanged; and then receiving Q readings from the toner level sensor, wherein each of the readings is within a prescribed percent of the report value;

calculating a Q reading average;

if the Q reading average is less than the report value, setting the report value to the Q reading average if the Q reading average is not less than the report value, leaving the report value unchanged.

21. A method as recited in claim 20, further comprising:

continually repeating the recited actions of:

receiving Q readings from the toner level sensor, wherein each of the readings is within a prescribed percent of the report value;

calculating a Q reading average; and if the Q reading average is less than the report value, setting the report value to the Q reading average.

22. A method as recited in claim 20, further comprising:

setting the report value to an arbitrary number upon powering up a printer or replacing a toner cartridge.

23. A method as recited in claim 20, wherein receiving readings further comprises:

pushing sensed values from the toner level sensor each time a change occurs in the sensed value.

24. A method as recited in claim 20, wherein receiving readings further comprises:

pulling sensed values from the toner level sensor at a preset interval.

25. A method as recited in claim 24, wherein the preset interval is a temporal interval.

26. A method as recited in claim 24, wherein the preset interval is an event based interval.

27. A method as recited in claim 20, further comprising:

reporting the report value upon request.

28. A method as recited in claim 20, further comprising:

reporting the report value automatically at a preset interval.

29. A method as recited in claim 28, wherein the preset interval is a temporal interval.

30. A method as recited in claim 28, wherein the preset interval is an event based interval.

31. A method as recited in claim 20, wherein the prescribed percent is 10 percent.

32. A method as recited in claim 20, wherein N, M and Q each equals 8.

33. A method as recited in claim 20, wherein toner is any marking agent stored in a cartridge for use in a print device.

34. A print device, having computer-readable media with computer-readable instructions for performing the method as recited in claim 20.

35. A computer, having computer-readable media with computer-readable instructions for performing the method as recited in claim 20.

36. A printer comprising:

a consumable marking agent;

a sensor to sense the amount of marking agent;

a printer controller configured to:

set a report level of the marking agent; then receive and average a group of readings from the sensor and, if the group average is less than the report level, to set the report level to the group average, but if the group average is not less than the report level, to leave the report level unchanged; and then receive and average a subsequent group of readings from the sensor, each reading of the subsequent group of readings being within a prescribed percent of the report level, and, if the subsequent group average is less than the report level, to set the report level to the subsequent group average, but if the subsequent group average is not less than the report level, to leave the report level unchanged.

37. A printer as recited in claim 36, wherein the printer controller is further configured to continually receive and average subsequent groups of readings from the sensor, each reading of the subsequent groups of readings being within a prescribed percent of the report level, and, if any subsequent group average is less than the report level, to set the report level to that subsequent group average.

38. A printer as recited in claim 36, wherein a printer controller configured to set a report level of the marking agent further comprises:

a printer controller configured to receive readings from the sensor and select the highest reading as the report level.

39. A system comprising:

a sensor configured to sense the amount of a marking agent; and a printer controller configured to:

set a report level of the marking agent; and then successively receive and average groups of readings from the sensor, and if the average of any group of readings is less than the report level, to set the report level to that average, but if the average of any group of readings is not less than the report level, to leave the report level unchanged.

* * * * *

UNITED STATES PATENT AND TRADEMARK OFFICE

CERTIFICATE OF CORRECTION

PATENT NO. : 7,102,770 B2
APPLICATION NO. : 09/881442
DATED : September 5, 2006
INVENTOR(S) : Trevor A. Wells et al.

It is certified that error appears in the above-identified patent and that said Letters Patent is hereby corrected as shown below:

In column 10, line 48, in Claim 3, after "recited" delete "In" and insert -- in --, therefor.

Signed and Sealed this

Third Day of February, 2009

JOHN DOLL
*Acting Director of the United States Patent and Trademark Office*